United States Patent [19]

McCoy et al.

[11] 4,411,775
[45] Oct. 25, 1983

[54] DEMULSIFICATION OF BITUMEN EMULSIONS USING WATER SOLUBLE EPOXY-CONTAINING POLYETHERS

[75] Inventors: David R. McCoy; Michael Cuscurida; George P. Speranza, all of Austin, Tex.

[73] Assignee: Texaco Inc., White Plains, N.Y.

[21] Appl. No.: 326,460

[22] Filed: Dec. 2, 1981

[51] Int. Cl.³ .......................................... C10G 33/04
[52] U.S. Cl. ................................. 208/188; 252/358; 210/708; 210/732; 210/737
[58] Field of Search .................. 208/188; 252/358; 210/708, 732, 737

[56] References Cited

U.S. PATENT DOCUMENTS

| | | | |
|---|---|---|---|
| 2,792,400 | 5/1957 | De Groote et al. | 252/358 |
| 2,882,250 | 4/1959 | Baker | 252/358 |
| 2,996,551 | 8/1961 | De Groote et al. | 252/358 |
| 3,585,148 | 6/1971 | Sachis | 210/708 |
| 3,738,945 | 2/1972 | Panzer et al. | 564/292 |
| 4,281,199 | 7/1981 | Langdon | 210/736 |
| 4,321,148 | 3/1982 | McCoy et al. | 252/341 |

*Primary Examiner*—Delbert E. Gantz
*Assistant Examiner*—Helane E. Maull
*Attorney, Agent, or Firm*—Jack H. Park; Kenneth R. Priem; David L. Mossman

[57] ABSTRACT

A process for recovering bitumem from oil-in-water (O/W) emulsions is disclosed wherein water soluble demulsifiers are used. These demulsifiers are water soluble polyethers prepared by the reaction between certain diepoxides and poly(ethyleneoxy) glycols. To resolve the bituminous petroleum emulsions, the process is carried out between 25° and 160° C. wherein the demulsifier of the invention is contacted with the bituminous emulsion.

5 Claims, No Drawings

DEMULSIFICATION OF BITUMEN EMULSIONS USING WATER SOLUBLE EPOXY-CONTAINING POLYETHERS

BACKGROUND OF THE INVENTION

1. Field of the Invention

This invention is concerned with the breaking or resolution of oil-in-water (O/W) bituminous emulsions by treatment with water soluble polyethers.

2. Description of the Related Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semi-solid. These bituminous hydrocarbons are usually characterized by being very viscous or even non-flowable under reservoir conditions by the application of driving fluid pressure.

Where surface mining is not feasible, the bitumen must be recovered by rendering the tar material mobile in-situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions.

C. W. W. Gewers, *J. Canad. Petrol. Tech.*, 7 (2), 85–90 (1968) describes the uniqueness of emulsions encountered in the production of bitumen from tar sands.

Application Ser. No. 326,462 filed of even date discloses a demulsification method utilizing polymers derived from diepoxides and poly(alkyleneoxy) diamines.

Application Ser. No. 183,611 filed Sept. 2, 1980, now allowed, discloses the composition of matter utilized in the demulsification process of this invention.

Application Ser. No. 329,917 filed Dec. 11, 1981, now allowed, discloses a demulsification method utilizing reaction products of poly(alkyleneoxy) glycols with diisocyanates.

SUMMARY OF THE INVENTION

The invention is a method for recovering petroleum from O/W bitumen emulsions by resolving or breaking (demulsifying) these emulsions by contacting the emulsions at a temperature of from between about 25° and 160° C. with water soluble polyethers prepared by the acid- or base-catalyzed reaction of poly(ethyleneoxy) glycols of 2,000 to 10,000 molecular weight having the structure $$HO(CH_2CH_2O)_nH$$

where n = about 40 to about 250 with 0.5–10 weight percent diepoxides of $\leq 600$ molecular weight of the general structure

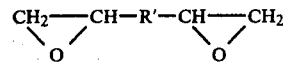

wherein R' is an aromatic or aliphatic group which may optionally contain ether groupings.

DESCRIPTION OF THE PREFERRED EMBODIMENTS

The reaction between the poly(ethyleneoxy) glycols and the diepoxides above may take place either neat or in inert solvent at temperatures ranging from about 20° to 200° C., preferably 60° to 150° C., in the presence of catalysts; for example, alkali metals, their hydroxides or alkoxides, or in the presence of Lewis acid catalysts such as $BF_3$ or $SnCl_4$.

The water soluble products of these reactions are characterized by the presence of substantial quantities (>20%) of unreacted poly(ethyleneoxy) glycols as well as higher molecular weight polyether-containing polyols arising from ring-opening reactions of the epoxy functionalities with alcohol groups.

The produced bitumen emulsions may be treated by the process of our invention in a conventional manner, for example, in a conventional horizontal treater operated, for example, from about 25° to 160° C. and, preferably, from about 50°–150° C. at autogenous pressures. The concentration of the chemical demulsifier described above used in treating the bitumen in water emulsions may range from about 1 to 200 parts per million and, preferably, from about 30 to 150 parts per million with the optional addition of an organic diluent and/or inorganic salt as well as standard flocculants and mechanical or electrical means of demulsification.

The following examples describe more fully the present process. However, these examples are given for illustration and are not intended to limit the invention.

EXAMPLE I

Addition of Diepoxide to Peg*-2900

Charged a 1-liter resin flask with 200 g of a 2,900 molecular weight poly(ethyleneoxy) glycol and 0.5 g potassium hydroxide. The mixture was mechanically stirred at 1 mm Hg pressure at 100° C. for one-half hour, nitrogen purged, cooled to 70° C. and treated with 10.3 g EPON 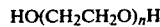 828 (commercial diglycidyl ether of Bisphenol A). The mixture was heated under nitrogen to 120° C. over 15 minutes with good agitation and maintained at this temperature for 2 hours. Liquid chromatographic analysis of the product on a Toyo Soda column showed peaks at approximately 2,800, 40,000 and 100,000 molecular weight with a $M_N$ of 4,000 and $M_W$ of 17,000.

*PEG is poly(ethyleneoxy) glycol. The number following is the molecular weight.

EXAMPLE II

Addition of Excess Diepoxide to Peg-2900

The procedure of Example I was repeated using 14 g EPON 828 (7 wt.%). The product was a water insoluble gel. This demonstrates that for each poly(ethyleneoxy) glycol utilized, there exists an upper limit to the amount of diepoxide that can be added and still obtain a water soluble product.

EXAMPLE III

Addition of Epon 828 To Peg-7500

The general procedure of Example I was repeated using (a) PEG-7500 in place of PEG-2900, (b) 7 g of EPON 828, and (c) a reaction temperature raised from 70° C. to 115° C. over a period of 45 minutes. At 115° C. the reaction was quenched by addition of 400 g of water. Insoluble gel particles were removed, leaving a clear product solution. Liquid chromatographic analysis showed the product to have molecular weight peaks at approximately 8,000 (80 vol.%) and >100,000 (20 vol.%) with $M_N=4,280$ and $M_W=26,380$.

EXAMPLE IV

Addition of Epon 828 to Peg-1450

The general procedure of Example I was repeated using (a) PEG-1450 in place of PEG-2900, (b) 10 g EPON 828, (c) reaction time of one-half hour at 120° C., and (d) final quenching of reaction by addition of 200 g of water. Liquid chromatographic analysis of the product showed peaks at approximately 1,650 and 13,000 molecular weight with $M_N=1,450$ and $M_W=2,100$.

EXAMPLE V

Addition of Diepoxyoctane to Peg-7500

A 1-liter resin flask was charged with 200 g of PEG-7500 and 0.3 g KOH and vacuum stripped at 100° C. for one-half hour. To this stirred solution under nitrogen were added 5.5 g of 1,2,7,8-diepoxyoctane at 100° C. over 15 minutes. The mixture was maintained at this temperature for an additional one and one-half hours followed by quenching with 250 g of water.

EXAMPLE VI

Addition of Epon 828 Jeffox ® FF-200

The general method of Example I was used to add 2 wt.% EPON 828 to a 10,000 molecular weight mixed 75 wt.% ethylene oxide:25 wt.% propylene oxide diol.

EXAMPLE VII

Demulsifier Testing

The following basic testing procedure was employed:
a. A 1 weight percent aqueous solution of each chemical was prepared.

b. A 30 ml PYREX ® test tube equipped with screw top was charged with 23 ml emulsion of 11.5 weight percent bitumen content obtained by in-situ steam flooding in tar sand pattern located at Ft. McMurray, Alberta, Canada.

c. 2 ml Wizard Lake crude oil was added as diluent and the contents of the test tube were mixed.

d. The contents of the test tube were equilibrated in a 80° C. oven for 1-2 hours and mixed again.

e. Chemical was added to the hot, dilute emulsion at the following concentrations: 60, 120 ppm.

f. Contents of the test tubes were mixed, re-equilibrated in an oven at 80° C. for 1 hour and mixed again.

g. After 20 hours of standing at 80° C., measurements were made on the volume of top and middle layers, and the appearance of the aqueous phase was noted. Samples of some top layers were carefully removed by pipetting and subjected to Karl-Fischer analysis for determination of the water content.

Results of the testing are summarized in the following table. Emulsion quality varied greatly from run to run so in each case comparison is made to a run with identical emulsion using POLYOX ® WSR-301 [4 million molecular weight poly(ethyleneoxy) glycol], a known emulsion breaker.

Successful examples are given of products derived from PEG's of 2900 to 7500 molecular weight (a and c, respectively) and from both aromatic and aliphatic diepoxides (a and c, and i, respectively).

Negative examples are given showing the relative ineffectiveness of products prepared from (1) low molecular weight PEG's (f) and from polyols containing propyleneoxy groups in addition to ethyleneoxy groups (l).

DEMULSIFIER TESTING

| Example VII | Candidate Demulsifier | Concentration (ppm) | Oil Phase Volume in ml. (% H2O) | | Emulsion Phase Volume in ml. (% H2O) | Aqueous Phase Appearance |
|---|---|---|---|---|---|---|
| a | Product of Ex. I | 60 | 6.25 | (29.7) | None | Muddy |
| b | POLYOX WSR-301 | 60 | 7.7 | (67.6) | 0.25 | Translucent |
| c | Product of Ex. III | 120 | 8.2 | (61.2) | None | Dark, translucent |
| d | POLYOX WSR-301 | 120 | 7.4 | (31.4) | 1.2 | Almost translucent |
| e | None | — | 3.6 | | 3.4 | Muddy |
| f | Product of Ex. IV | 120 | 2.4 | | 2.9 | Muddy |
| g | POLYOX WSR-301 | 120 | 6.2 | (58.4) | 1.4 | Dark, translucent |
| h | None | — | 2.2 | | 2.6 | Muddy |
| i | Product of Ex. V | 120 | 10.3 | (80) | None | Yellow, clear |
| j | POLYOX WSR-301 | 120 | 7 | (89.1) | 2.2 | Translucent |
| k | None | — | 5.5 | | 1.2 | Muddy |
| l | Product of Ex. VI | 120 | 8 | (88.3) | 0.25 | Dark, translucent |
| m | POLYOX WSR-301 | 120 | 7.4 | (61.7) | 1.2 | Translucent |
| n | None | — | 1.7 | | 3.4 | Muddy |

Note:
Horizontal lines denote runs made on same day with same emulsions

We claim:
1. A process for recovering petroleum from oil-in-water (O/W) bitumen emulsions by demulsifying said emulsions comprising contacting the emulsions at a temperature of from between about 25° and 160° C. with water soluble polyethers prepared from the acid- or base-catalyzed reaction of poly(ethyleneoxy) glycols of the structure

$$HO(CH_2CH_2O)_nH$$

where n=40 to 250 with 0.5-10 wt.% diepoxides of ≦600 molecular weight of the general structure

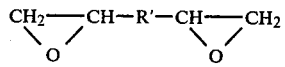

wherein R' is an aromatic group.

2. A process as in claim 1 where R' also contains ether groups.

3. A process as in claim 1 or 2 wherein the diepoxide is the diglycidyl ether of Bisphenol A.

4. A process as in claim 1 wherein the reaction between the poly(ethyleneoxy) glycols and diepoxides takes place at temperatures ranging from 20° to 200° C. in the presence of a catalyst.

5. A process as in claim 4 wherein the reaction takes place at temperatures ranging from about 60° to 150° C.

* * * * *